United States Patent [19]

Kowalczyk

[11] Patent Number: 4,610,703
[45] Date of Patent: Sep. 9, 1986

[54] AIR PURIFIER FOR PROTECTING MOTOR VECHICLE OCCUPANTS FROM POLLUTION

[76] Inventor: Thaddeus Kowalczyk, 8163 Lochdale, Dearborn Heights, Mich. 48127

[21] Appl. No.: 824,610

[22] Filed: Jan. 31, 1986

[51] Int. Cl.⁴ ............................................. B01D 46/00
[52] U.S. Cl. ......................................... 55/274; 55/21; 55/DIG. 34; 98/2.11; 116/DIG. 25; 340/607
[58] Field of Search ...................... 55/21, 63, 213, 273, 55/274, DIG. 34; 98/2.07, 2.11; 116/DIG. 25, 268; 340/607

[56] References Cited

U.S. PATENT DOCUMENTS

| | | | |
|---|---|---|---|
| 3,027,865 | 4/1962 | Kautz et al. | 55/274 X |
| 3,950,155 | 4/1976 | Komiyama | 55/274 X |
| 4,014,209 | 3/1977 | Emerick | 55/274 X |
| 4,319,519 | 3/1982 | Parsson | 98/2.11 |
| 4,407,354 | 10/1983 | Takishita et al. | 98/2.11 X |
| 4,451,435 | 5/1984 | Holter et al. | 98/2.11 X |

FOREIGN PATENT DOCUMENTS

| | | | |
|---|---|---|---|
| 2655932 | 6/1978 | Fed. Rep. of Germany | 55/213 |
| 3228888 | 2/1984 | Fed. Rep. of Germany | 98/2.11 |
| 3330950 | 3/1985 | Fed. Rep. of Germany | 98/2.11 |

Primary Examiner—Charles Hart

[57] ABSTRACT

This invention is a pollution cleansing system inside a motor vehicle for the protection of the occupants. An "Air Purifier" is built into the vehicle's cowl plenum chamber of the heating-cooling system and in the vehicle's side vents. The "Air Purifier" prevents pollutants, such as exhaust fumes of the motor vehicle, including dust and smoke entering the motor vehicle interior. By installing the "Air Purifier" in motor vehicles we can be assured of breathing purer air.

3 Claims, 4 Drawing Figures

U.S. Patent  Sep. 9, 1986  4,610,703
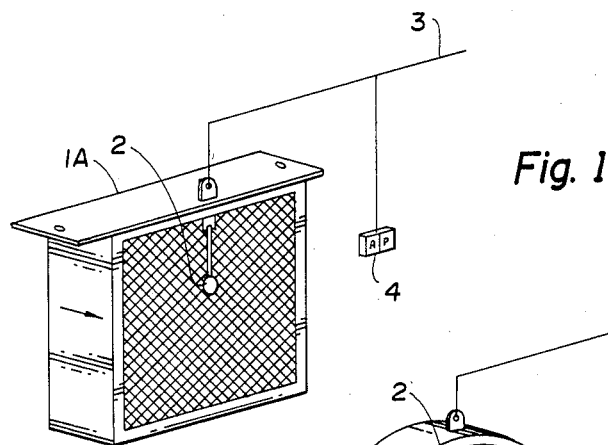
Fig. 1
Fig. 2
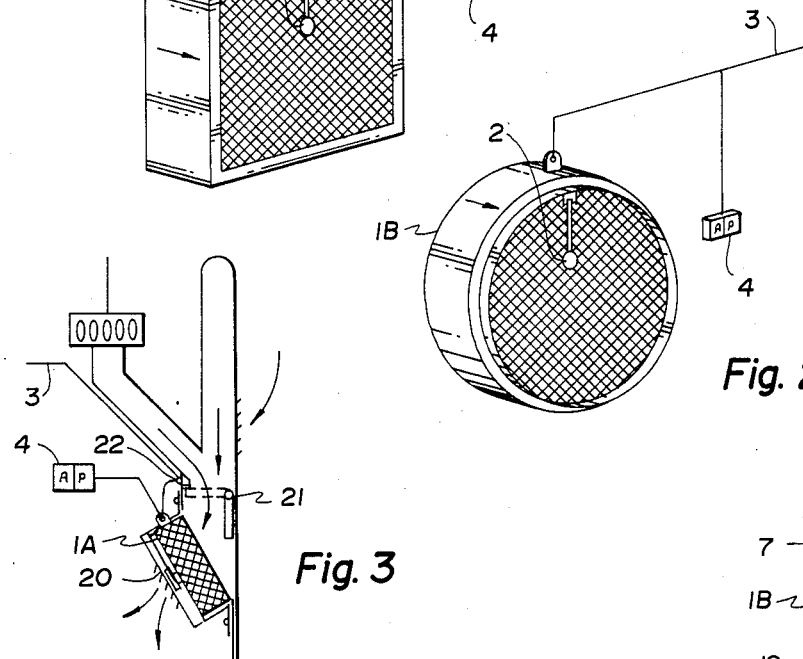
Fig. 3
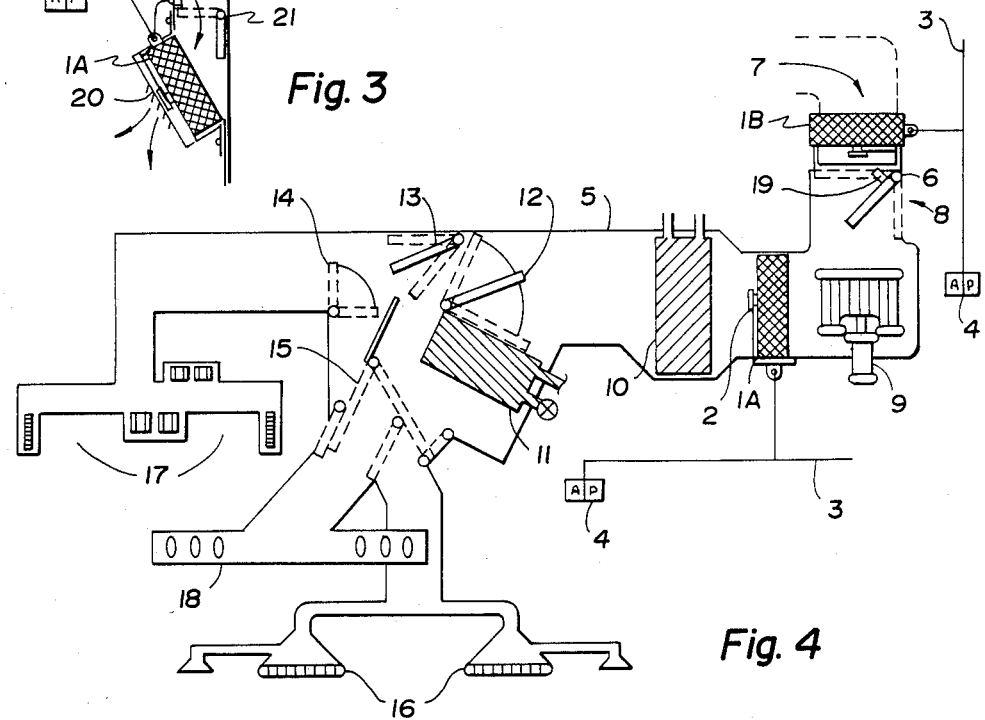
Fig. 4

AIR PURIFIER FOR PROTECTING MOTOR VECHICLE OCCUPANTS FROM POLLUTION

TECHNICAL FIELD

This invention relates to the use of an "Air Purifier" to cleanse polluted air. More particularly, the invention relates to a container of appropriate size with inflow and outflow openings, containing on the inside a filter composed of the right components for the occupants of an motor vehicle, through which the inflowing air containing pollutants is cleansed by the "Air Purifier".

BACKGROUND ART

The aim of the present "Air Purifier" invention as applied to passengers motor vehicles is to protect the health and in certain cases to prevent outright poisoning all of its occupants. The whole world is becoming one great highway owing to the greater availability of motor vehicles to people the world over. The only air that the driver and passengers can breathe is the air in the motor vehicle which enters the interior through inlets in the heating-cooling system and also through the side vents. This incoming air is often polluted by the fumes emitted from the motors of passing motor vehicles. One of the best solutions to this problem is to use an "Air Purifier". The present invention is aimed at preventing poisonings and ensuring better health.

DISCLOSURE OF THE INVENTION

Many years have passed since the invention of the motor vehicle. Today, there are millions of them and more and more of those that make use of fuel, diesel fuel and alcohol. Built in various sizes, they burn these various fuels and emit noxious fumes that pollute the air. These motor vehicles are used for various purposes, to transport peoples in buses, for instance. Certain jobs require that we spend many hours in motor vehicles. Almost every working person uses a motor vehicle for various reasons. In all of this we inhale polluted air. To this day, all that has been done to protect people from exhaust fumes is to have installed an exhaust system converter and returning a portion of the exhaust fumes returns for a secondary burning.

One of the greatest needs in our motor vehicle today is to install an "Air Purifier" to clean the air pulled into our motor vehicle of pollutants. Such an "Air Purifier" would be installed in the cowl plenum chamber in a position in line with the air being pulled into the motor vehicle by the blower and through the side vents in the air supply that flows from the exterior into to the interior. This "Air Purifier" is equipped with a sensor switch that notifies the driver whenever the "Air Purifier" becomes dirty and must be replaced. This sensor switch is closed by a spring to cause a warning light associated with the "Air Purifier" to illuminate on the instrument panel. When the "Air Purifier" is clean, the use of a blower will cause the air to push away the sensor plate preventing the warning light on the instrument panel from illuminating. When the "Air Purifier" becomes dirty, the air being drawn by the blower will diminish in strength and not be able to move the sensor plate and, thereby, cause the warning light to illuminate.

BRIEF DESCRIPTION OF DRAWING

FIG. 1 and FIG. 2. is a rear perspective view of the "Air Purifier" of the present invention which is built into the cowl plenum chamber of the heating-cooling system and in the side vents of a vehicle also indicating the location of the sensor switch, which is connected by an electrical line to a warning light on the instrument panel and the power line.

FIG. 3 is a diagramatic view showing the "Air Purifier" installed in the side vents of a vehicle.

FIG. 4 is an overall diagnostic view showing the particulare elements located in the plenum chamber system including the "Air Purifier", system 1-A and 1-B, by means of which the air into the motor vehicle from the exterior and forces interior, the evaporator which cools air, the heater core which warms the air, and the doors which regulate the flow of air to the appropriate outlets.

BEST MODE FOR CARRYING OUT THE INVENTION

What follows is a detailed description of the invention which is illustrated in the drawing and whose construction forms the present invention. The "Air Purifier" 1-A or 1-B is an appropriate filter which removes pollutants admitted from the exhaust fumes of the motor vehicle, including dust and smoke the occupants of the motor vehicle. This "Air Purifier" 1-A and 1-B is installed in the cowl plenum chamber 5 and also the purifier 1-A is installed in the side vents 20 in the air intake path. Sensor switch 2 is mounted adjacent the "Air Purifier" on the downstream air flow side. This sensor switch causes the warning light 4 window A and P on the instrument panel to illuminate when the "Air Purifier" becomes clogged with dirt. The warning light 4 window A is connect with the "Air Purifier" 1-A, while window P is connected with the "Air Purifier" 1-B. The electric line 3 connects the sensor switch to the warning light 4. Heater plenum chamber 5 in which the necessary instruments are provided that pull in air from the exterior, clean it, cool or heat it and conduct it to the appropriate outlets. A door 6 is provided which allows theair from the outside to enter the vehicle through inlet 7 or inlet 8 for recirculating the air, on the door is monted knob 19. When the door 6 closes inlet 7, the knob disables warning light 4. Door 21 allows allows the air from the outside to enter the interior by vents 20. When this door closed warning light 4 is disabled by disconnector 22. Blower 9 pulls the air in from the outside and forces it into the interior, evaporator 10 cools the air, heater core 11 heats the air. Air mix door 12 provides a regulating means the heating or cooling of the air, and doors 13, 14, 15 provide a means for regulating the flow of air to the defroster vents 16, front vents 17 and floor vents 18.

What is claimed is:

1. An air purifier system for the passenger compartment of a passenger motor vehicle, comprising:
   a plenum having an "Air Purifier" therein;
   an air inlet for introducing outside air into said plenum;
   vent means in said plenum for directing air from said plenum into said passenger compartment;
   means coupled with said plenum for conditioning air introduced into said plenum;
   means for purifying the air introduced into said plenum, said air purifier including an air filter in said plenum through which air may flow and in which dirt from said air may accumulate to clog said air filter; and monitoring means for generating an electrical signal indicating that said filter is clogged with dirt, said monitoring means including a sensor switch having a moveable sensor plate mounted on the downstream side of and in the path of airflowing through said filter so as to be moved to a first position in which said switch is open and said signal is prevented from being generated, said monitoring means including means for biasing said sensor plate to a second position in the absence of sufficient air flow through said filter when said filter is clogged, said sensor switch generating said signal in response to the movement of said sensor plate to said second position.

2. The air purifying system of claim 1, including a light in said passenger compartment which is energizeable by said electrical signal to alert passengers that said filter is clogged.

3. The air purifying system of claim 2, including a moveable door for controlling the flow of air through a portion of said plenum and through said filter, said door being moveable between a first position in which air may flow through said filter and a second position in which air is prevented from flowing through said filter, said system including means on said door for disabling said light when said door is in said second position thereof.

* * * * *